(12) United States Patent
Ke

(10) Patent No.: US 10,942,858 B2
(45) Date of Patent: Mar. 9, 2021

(54) DATA STORAGE DEVICES AND DATA PROCESSING METHODS

(71) Applicant: Silicon Motion, Inc., Jhubei (TW)

(72) Inventor: Kuan-Yu Ke, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 16/704,646

(22) Filed: Dec. 5, 2019

(65) Prior Publication Data

US 2020/0264981 A1 Aug. 20, 2020

(30) Foreign Application Priority Data

Feb. 20, 2019 (TW) .................................. 108105660

(51) Int. Cl.
*G06F 12/08* (2016.01)
*G06F 12/0882* (2016.01)
*G06F 12/02* (2006.01)
*G06F 12/0873* (2016.01)
*G06F 12/1009* (2016.01)
*G06F 3/06* (2006.01)

(52) U.S. Cl.
CPC .......... *G06F 12/0882* (2013.01); *G06F 3/064* (2013.01); *G06F 3/0604* (2013.01); *G06F 3/0656* (2013.01); *G06F 3/0679* (2013.01); *G06F 12/0246* (2013.01); *G06F 12/0873* (2013.01); *G06F 12/1009* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 6,697,076 | B1 * | 2/2004 | Trivedi | G06F 12/0815 345/531 |
| 9,552,289 | B1 * | 1/2017 | Spencer | G06F 12/0246 |
| 10,884,947 | B2 * | 1/2021 | Bhatia | G06F 12/0246 |
| 2015/0039814 | A1 * | 2/2015 | Lim | G06F 12/0246 711/103 |
| 2018/0275873 | A1 * | 9/2018 | Frid | G06F 12/0246 |
| 2019/0220416 | A1 * | 7/2019 | Jung | G06F 12/1009 |
| 2019/0339904 | A1 * | 11/2019 | Myran | G06F 12/0246 |
| 2020/0242021 | A1 * | 7/2020 | Gholamipour | G06F 12/0246 |

* cited by examiner

*Primary Examiner* — Kevin Verbrugge
(74) *Attorney, Agent, or Firm* — Wang Law Firm, Inc.

(57) ABSTRACT

A data storage device includes a memory device and a memory controller. The memory controller selects a predetermined memory block to receive data and records multiple logical addresses in a first mapping table. The first mapping table records which logical page the data stored in each physical page of the predetermined memory block is directed to. A bit table is stored in a buffer memory and includes multiple fields. Each field records a bit value. When the memory controller writes data of a logical page that corresponds to a first logical address into the predetermined memory block, the memory controller records the first logical address in the first mapping table, converts the first logical address according to a predetermined function to generate a first field index of the bit table and sets the bit value corresponding to the first field index as a first value in the bit table.

16 Claims, 5 Drawing Sheets

DATA STORAGE DEVICES AND DATA PROCESSING METHODS

CROSS REFERENCE TO RELATED APPLICATIONS

This application claims priority of Taiwan Patent Application No. 108105660, filed on Feb. 20, 2019, the entirety of which is incorporated by reference herein.

BACKGROUND OF THE INVENTION

Field of the Invention

The invention relates to a data storage device and a data processing method capable of speeding up the read operation of the memory device of the data storage device.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access performance of the data storage device, a novel data processing method which is capable of improving the access performance of the memory device is proposed.

BRIEF SUMMARY OF THE INVENTION

Data storage devices and data processing methods are provided. An exemplary embodiment of a data storage device comprises a memory device and a memory controller. The memory controller comprises a plurality of memory blocks, and each memory block comprises a plurality of physical pages. The memory controller is coupled to the memory device and configured to access the memory device. The memory controller is configured to select a predetermined memory block to receive data and accordingly record a plurality of logical addresses in a first mapping table. The memory controller comprises a buffer memory, the first mapping table is stored in the buffer memory and records which logical page the data stored in each physical page of the predetermined memory block is directed to. The buffer memory further stores a bit table, the bit table comprises a plurality of fields and each field records a bit value. When the memory controller writes data of a logical page that corresponds to a first logical address into the predetermined memory block in response to a write command, the memory controller records the first logical address in the first mapping table, converts the first logical address according to a predetermined function to generate a first field index of the bit table and sets the bit value corresponding to the first field index as a first value in the bit table.

An exemplary embodiment of a data processing method for a data storage device comprising a memory device and a memory controller, wherein the memory device comprises a plurality of memory blocks, each memory block comprises a plurality of physical pages, and the memory controller is coupled to the memory device and configured to access the memory device. The method is performed by the memory controller and comprises: selecting a predetermined memory block to receive data; receiving a write command to write data of a logical page corresponding to a first logical address to the predetermined memory block; recording the first logical address in a first mapping table, wherein the first mapping table is stored in a buffer memory of the memory controller and records which logical page the data stored in each physical page of the predetermined memory block is directed to; converting the first logical address according to a predetermined function to generate a first field index of a bit table, wherein the bit table is stored in the buffer memory and comprises a plurality of fields, and each field records a bit value; and setting the bit value corresponding to the first field index as a first value in the bit table.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof. The scope of the invention is determined by reference to the appended claims.

Figure 1:
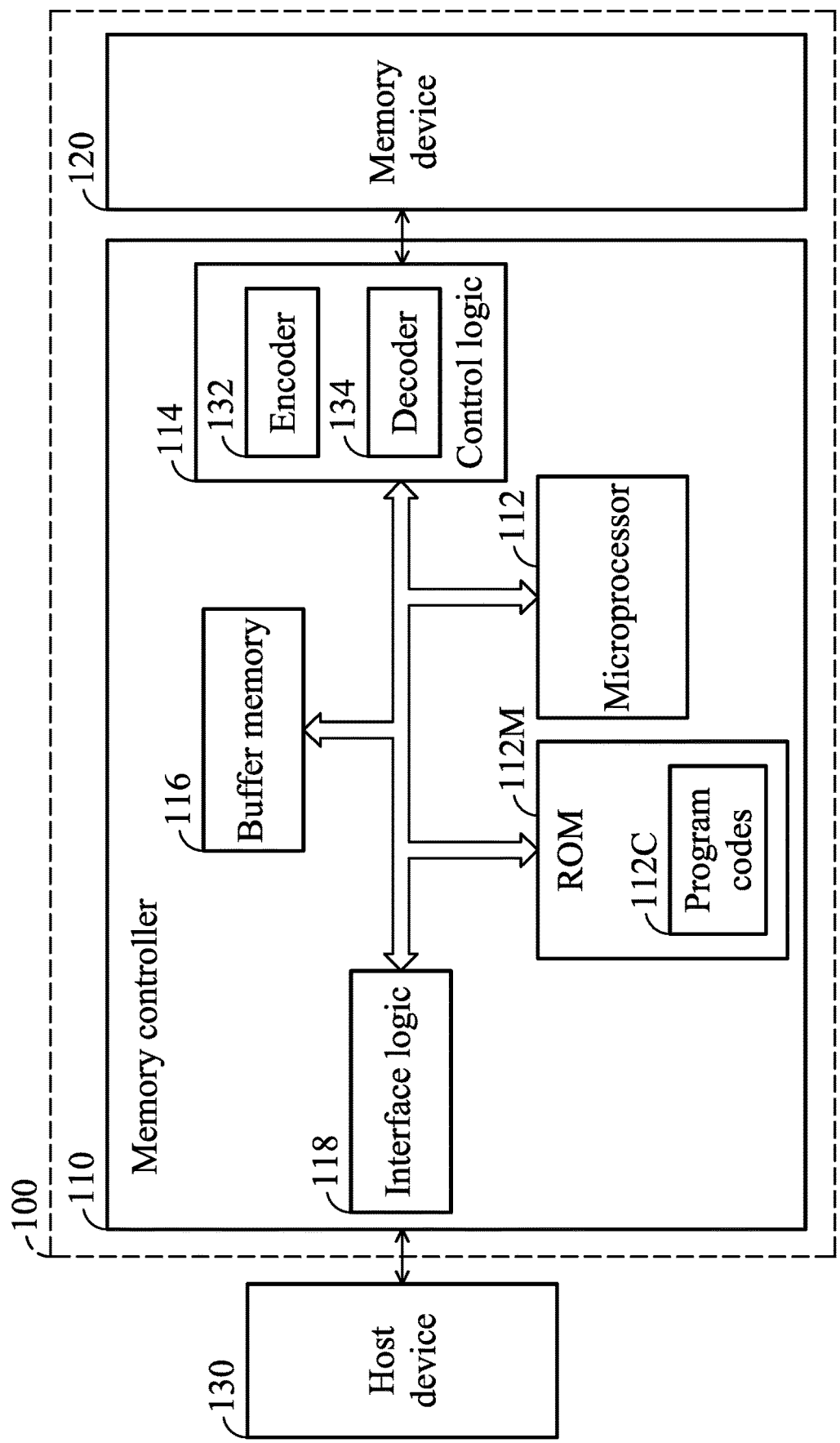
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, that is, the physical pages, and the access unit of a write operation performed by the controller (e.g., the memory controller 110, through the execution of the program codes 112C by the microprocessor 112) on the memory device 120 may be one page.

In practice, the memory controller 110 may perform various control operations by using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. In an embodiment of the invention, the memory controller 110 may use the interface logic 118 to communicate with a host device 130 in compliance with a standard communication protocol. For example, the standard communication protocol may comprise (but not limited to) the Universal Serial Bus (USB) standard, the Secure Digital (SD) interface standard, the Ultra High Speed-I (UHS-I) interface standard, the Ultra High Speed-II (UHS-II) interface standard, the Compact Flash (CF) interface standard, the Multimedia Card (MMC) interface standard, the Embedded Multimedia Card (eMMC) interface standard, the Universal Flash Storage (UFS) interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data.

Generally, the memory device 120 may be divided into three regions, comprising a system region, a data region and a spare region. The memory controller 110 is configured to select a predetermined memory block from the spare region as a cache memory, or called a buffer, to receive data and buffer the data. When the predetermined memory block (that is, the buffer) is full (that is, has been fully written with data), the memory controller may further update the predetermined memory block currently being utilized as a buffer as a data block in the data region. For example, when the predetermined memory block currently being utilized as a buffer to receive data is an MLC or a TLC memory block, when the buffer is full, the predetermined memory block may be directly updated as a data block in the data region. When the predetermined memory block currently being utilized as a buffer to receive data is an SLC memory block, when a predetermined number of buffers are full, the memory controller may perform a garbage collection procedure to move the data stored in the buffers to an MLC or a TLC memory block (the target memory block) and update the target memory block as a data block in the data region.

According to an embodiment of the invention, the memory controller 110 is configured to maintain a first mapping table in the buffer memory 116. When using the predetermined memory block to receive data, the memory controller 110 is configured to accordingly store a plurality of logical addresses in the first mapping table. According to an embodiment of the invention, the first mapping table is a Flash to Host (F2H) mapping table. The first mapping table comprises a plurality of fields. Each field records mapping information of a corresponding physical page of the predetermined memory block. That is, the first mapping table records which logical page the data stored in each physical page of the predetermined memory block is directed to in a corresponding field. For example, the first mapping table may record the Logical Block Address (LBA) of a corresponding logical page, or may record the logical address of a logical page in other format.

According to an embodiment of the invention, the first mapping table may record the logical addresses in the form of an array. Each field of the first mapping table in the array corresponds to a physical page of the predetermined memory block. That is, the value of the array index of the first mapping table has a one-to-one mapping relationship with the index or the page number of the physical page of the predetermine memory block. For example, suppose that a starting array index of the first mapping table is 0, the logical address recorded in the first field of the first mapping table Table_1 (that is, the first record Table_1[0] recorded in the first mapping table Table_1), is the address of the logical page that the data stored in the first physical page of the predetermined memory block is directed to. Similarly, the logical address recorded in the second field of the first mapping table Table_1 (that is, the second record Table_1[1] recorded in the first mapping table Table_1), is the address of the logical page that the data stored in the second physical page of the predetermined memory block is directed to, and so on.

According to an embodiment of the invention, the memory controller 110 may sequentially write the data into the physical pages of the predetermined memory block according to the physical page number in an ascending manner. Therefore, the memory controller 110 may also record the logical address of the logical page corresponding to each physical page of the predetermined memory block in the corresponding fields of the first mapping table Table_1 according to the array index in an ascending manner. However, it should be noted that the invention is not limited to program the predetermined memory block according to the physical page number in an ascending manner.

According to an embodiment of the invention, when the predetermined memory block is full, the edition of the first mapping table Table_1 is completed, accordingly. Theoretically, the first mapping table Table_1 records the latest Flash to Host mapping information. When the memory controller 110 finishes the edition of the first mapping table Table_1, the memory controller 110 is configured to edit the second mapping table Table_2 according to the content recorded in the first mapping table Table_1, so as to update the latest mapping information to the second mapping table Table_2.

According to an embodiment of the invention, the second mapping table Table_2 may be stored in the system region of the memory device 120. The second mapping table Table_2 may be a Host to Flash (H2F) mapping table. The data recorded in the second mapping table Table_2 corresponds to a plurality of logical pages. Generally, the number of fields comprised in the second mapping table Table_2 is related to the number of logical pages comprised in the host device system, where one field of the second mapping table Table_2 corresponds to one logical page of the host device system, so as to record the mapping information of the corresponding logical page. That is, each field in the second mapping table Table_2 records which memory block and which physical page the data of the corresponding logical page is directed to (in other words, which memory block and which physical page the data of the corresponding logical page is stored in). According to an embodiment of the invention, the host device system may be a system comprising the host device 130 and the data storage device 100, or may be a system further comprising one or more peripheral devices coupled to the host device 130.

According to an embodiment of the invention, the second mapping table Table_2 may record a memory block number and a page number that correspond to each logical page in the form of an array, so as to record which memory block and which physical page data of each logical page is directed to (that is, which memory block and which physical page the data of each logical page is stored in). As discussed above, one field of the second mapping table Table_2 corresponds to one logical page. Therefore, the value of the array index of the second mapping table has a one-to-one mapping relationship with the index or the number of the logical page. For example, suppose that a starting array index of the second mapping table Table_2 is 0, the memory block number and the page number recorded in the first field of the second mapping table Table_2 (that is, the first record Table_2[0] recorded in the second mapping table Table_2), is the physical memory block number and the physical page number that the data of the first logical page of the host device system is stored in, the memory block number and the page number recorded in the second field of the second mapping table Table_2, (that is, the second record Table_2[1] recorded in the second mapping table Table_2), is the physical memory block number and the physical page number that the data of the second logical page of the host device system is stored in, and so on.

According to an embodiment of the invention, when editing the second mapping table Table_2, the memory controller 110 is configured to start from the starting array index of the first mapping table Table_1 to sequentially check the logical addresses recorded in the first mapping table Table_1, and look up the information stored in the second mapping table Table_2 according to the logical addresses recorded in the first mapping table to find content recorded in corresponding positions of the second mapping table Table_2. The memory controller 110 is further configured to update the content recorded in the second mapping table Table_2 according to the memory block number of the predetermined memory block and a corresponding array index of the first mapping table Table_1.

For example, the content recorded in the first field Table_1[0] of the first mapping table Table_1 is 0, which means that the data stored in the first physical page of the predetermined memory block is directed to the logical page with the logical address 0. The memory controller 110 then looks up content of the second mapping table Table_2 according to this logical address and loads one or a plurality of records including the record of this logical address into the buffer memory 116, so as to edit or update the content of the second mapping table Table_2. For example, the memory controller 110 may access the $1^{st}$ to $1024^{th}$ records recorded in the second mapping table Table_2 and load the content of the $1^{st}$ to $1024^{th}$ records into the buffer memory 116. Then, the memory controller 110 may update the content of the second mapping table Table_2 according to the memory block number of the predetermined memory block and a corresponding array index of the first mapping table Table_1. For example, the memory controller 110 may write the memory block number of the predetermined memory block and the corresponding array index 0 of the first mapping table Table_1 in the first field (the first record), that is, Table_2[0], of the second mapping table Table_2 as the mapping information of the logical page whose logical address is 0. It should be noted that since the portion of the second mapping table Table_2 loaded in the buffer memory 116 for content updating or editing is a copy of the second mapping table Table_2 stored in the memory device 120, in the embodiments of the invention, the portion of the second mapping table Table_2 loaded in the buffer memory 116 is also referred to as the second mapping table Table_2.

Generally, when the memory controller 110 has to read the data corresponding to a specific logical page, the memory controller 110 has to obtain the mapping information of the specific logical page (or, the mapping information of a corresponding logical address of the specific logical page) by searching the aforementioned mapping table. That is, the memory controller 110 has to know which physical page and which memory block of the memory device 120 that the data corresponding to the specific logical page is stored in by searching the aforementioned mapping table.

For example, since the first mapping table Table_1 records the latest Flash to Host mapping information, the memory controller 110 may determine to search the first mapping table Table_1 first (sometimes, for speeding up the search operations, the memory controller 110 may also load one or a plurality of records of the second mapping table Table_2 into the buffer memory 116 in the background at the same time). When searching the first mapping table Table_1, the memory controller 110 has to, starting from the first record of the first mapping table Table_1, compare the logical address recorded in the fields of the first mapping table Table_1 with the logical address of the specific logical page, one by one, to determine whether the logical address of the specific logical page is recorded in the first mapping table Table_1. When the memory controller 110 finds that the logical address recorded in a field is the same as the logical address of the specific logical page, the memory controller 110 may obtain the mapping information about which physical page of the predetermined memory block that the data of the specific logical page corresponding to this logical address is stored in according to the array index of the field recording this logical address. If the memory controller 110 cannot find any field that has recorded the logical address of the specific logical page after a thorough search of the first mapping table Table_1, the memory controller 110 can determine that the data of the specific logical page is not stored in the predetermined memory block currently being selected and utilized as a cache memory (also called a buffer). In this case, the memory controller 110 has to further read the second mapping table Table_2 to find out which physical page and which memory block of the memory device the data of the specific logical page is stored in.

However, searching the mapping table usually takes a lot of time, especially the operations of searching the first mapping table Table_1, since the memory controller 110 has to check and compare the records stored in the first mapping table Table_1 one by one. In order to obtain the mapping information of a specific logical page (or the mapping information of the corresponding logical address of the specific logical page) as soon as possible, a novel data processing method is proposed. Based on the proposed data processing method, the memory controller 110 determines that searching the first mapping table Table_1 is required only when the possibility the information that it needs is stored in the first mapping table Tablet is sufficient (e.g. higher than a predetermined threshold). Or, when the memory controller 110 determines that the information that it needs is not stored in the first mapping table Table_1 by applying the proposed data processing method, the memory controller 110 can directly skip the search of the first mapping table Table_1. In this manner, the above-mention time consuming problem can be solved and the read operation of the memory device can be effectively sped up.

According to an embodiment of the invention, the memory controller 110 may establish a bit table Bit_Table in the buffer memory 116. The bit table Bit_Table may comprise a plurality of fields and each field records a bit value. The memory controller 110 may update the bit table Bit_Table accompanying the edition of the first mapping table Table_1. In addition, when the memory controller 110 selects another memory block as the cache memory, for example, when the predetermined memory block being selected as the cache memory is full and the memory controller 110 has updated the content stored in the first mapping table Table_1 to the second mapping table Table_2, the memory controller 110 may reset the first mapping table Table_1 and accordingly reset the bit table Bit_Table. For example, the memory controller may set the value recorded in each field in the first mapping table Table_1 and the bit table Bit_Table as a default value.

According to an embodiment of the invention, the number of fields comprised in the bit table Bit_Table is smaller than the number of logical pages comprised in the host device system. In other words, according to an embodiment of the invention, there is a one-to-many mapping relationship between the fields of the bit table Bit_Table and the logical pages. That is, one field in the bit table Bit_Table may be utilized to indicate or represent the information of one or more logical pages.

It should be noted that although in the embodiment discussed above, each field of the bit table Bit_Table records a bit value, the invention should not be limited thereto. In other embodiments of the invention, each field of the bit table Bit_Table may also record the bit values of multiple bits.

In a normal operation, the memory controller 110 may receive a write command W_CMD which instruct the memory controller 110 to write the data of a logical page into the memory device 120 from the host device 130. The write command W_CMD may comprise the logical address of the corresponding logical page with data to be written into the memory device 120, and the memory controller 110 is configured to write the data of the corresponding logical page to the predetermined memory device currently being utilized as the cache memory (or the buffer) in response to the write command W_CMD.

According to an embodiment of the invention, after the memory controller 110 has written the data of a logical page corresponding to a first logical address in the predetermined memory block in response to the write command W_CMD, the memory controller 110 records the first logical address in the first mapping table Table_1. In addition, the memory controller 110 may further converts the first logical address according to a predetermined function to generate a first field index of the bit table Bit_Table and set the bit value corresponding to the first field index as a first value in the bit table Bit_Table. For example, the first value may be the bit '1'.

According to an embodiment of the invention, the predetermined function may be any function that can be utilized to disturb the distribution of the input data, and is characterized in that it can be used to map data of arbitrary size onto data of a fixed size. In addition, the size of input data may be greater than the size of the output data. That is, suppose that the predetermined function may be expressed as $\Theta(n)=m$, where n is the input data and N is the size of the input data n, m is the output data and M is the size of the output data m, and where n and m are non-negative integers, and N and M are positive integers, then N>M. According to an embodiment of the invention, the predetermined function is a random function or a hash function, characterized in that after the input data n is calculated based on the predetermined function, the value of the corresponding output data m can be uniformly distributed.

In addition, according to an embodiment of the invention, when the output data m generated based on the same predetermined function has two different values, the values of their corresponding input data n shall be different. That is, the predetermined function can have deterministic result. However, for the input data n having two different values, the corresponding values of the output data m generated based on the same predetermined function may be the same or different.

Figure 2A:
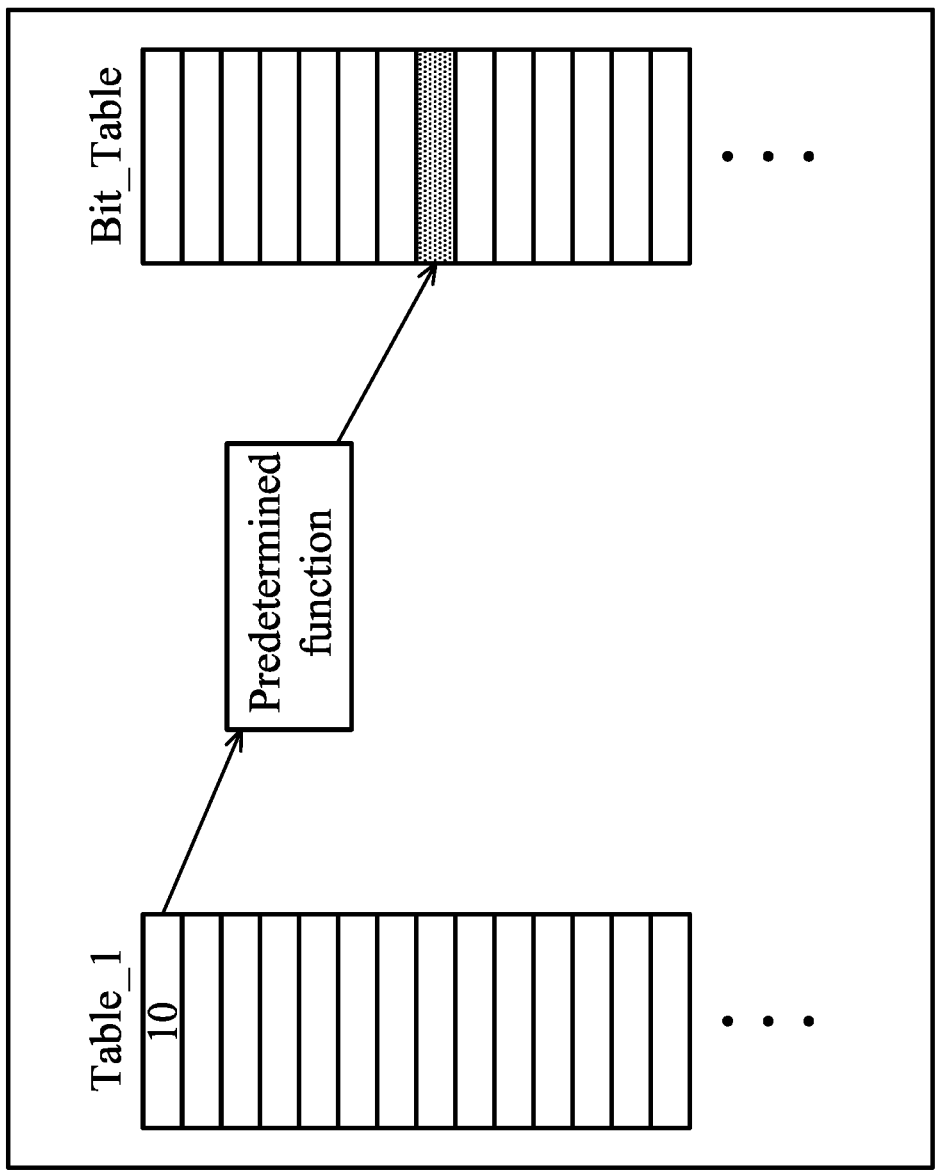
FIG. 2A and FIG. 2B are the schematic diagrams showing the conversion of the logical addresses to the field indices according to an embodiment of the invention.
Figure 2B:
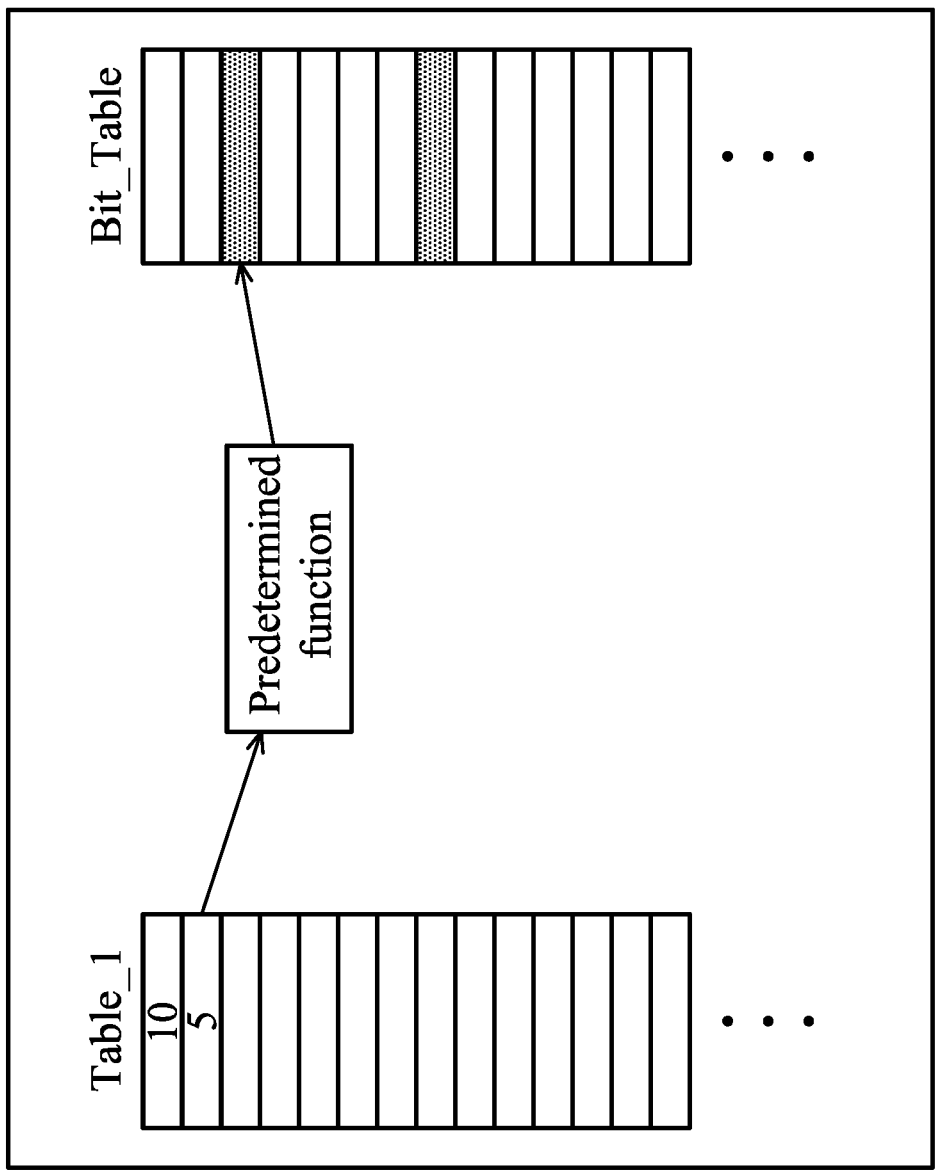

FIG. 2A and FIG. 2B are the schematic diagrams showing the conversion of the logical addresses to the field indices according to an embodiment of the invention. As shown in FIG. 2A, the bit value of each field in the bit table Bit table may be set to a second value, for example, the bit '0', by default. Suppose that the first record recorded in the first mapping table Table_1 is the logical address 10 and the value obtained after converting the logical address 10 according to the predetermined function is 7, this value 7 is the field index corresponding to the logical address 10. Therefore, the memory controller 110 may set the bit value of the $8^{th}$ field, that is the Bit_Table [7], of the bit table Bit_Table as the aforementioned first value, such as the bit '1'. In FIG. 2A, the column filled with multiple gray dots represents the field having the bit value set to '1'. Next, suppose that the second record recorded in the first mapping table Table_1 is the logical address 5 and the value obtained after converting the logical address 5 according to the predetermined function is 2, the memory controller 110 may set the bit value of the 3$^{rd}$ field, that is the Bit_Table [2], of the bit table Bit_Table as the aforementioned first value, such as the bit '1', as shown in FIG. 2B.

Figure 3:
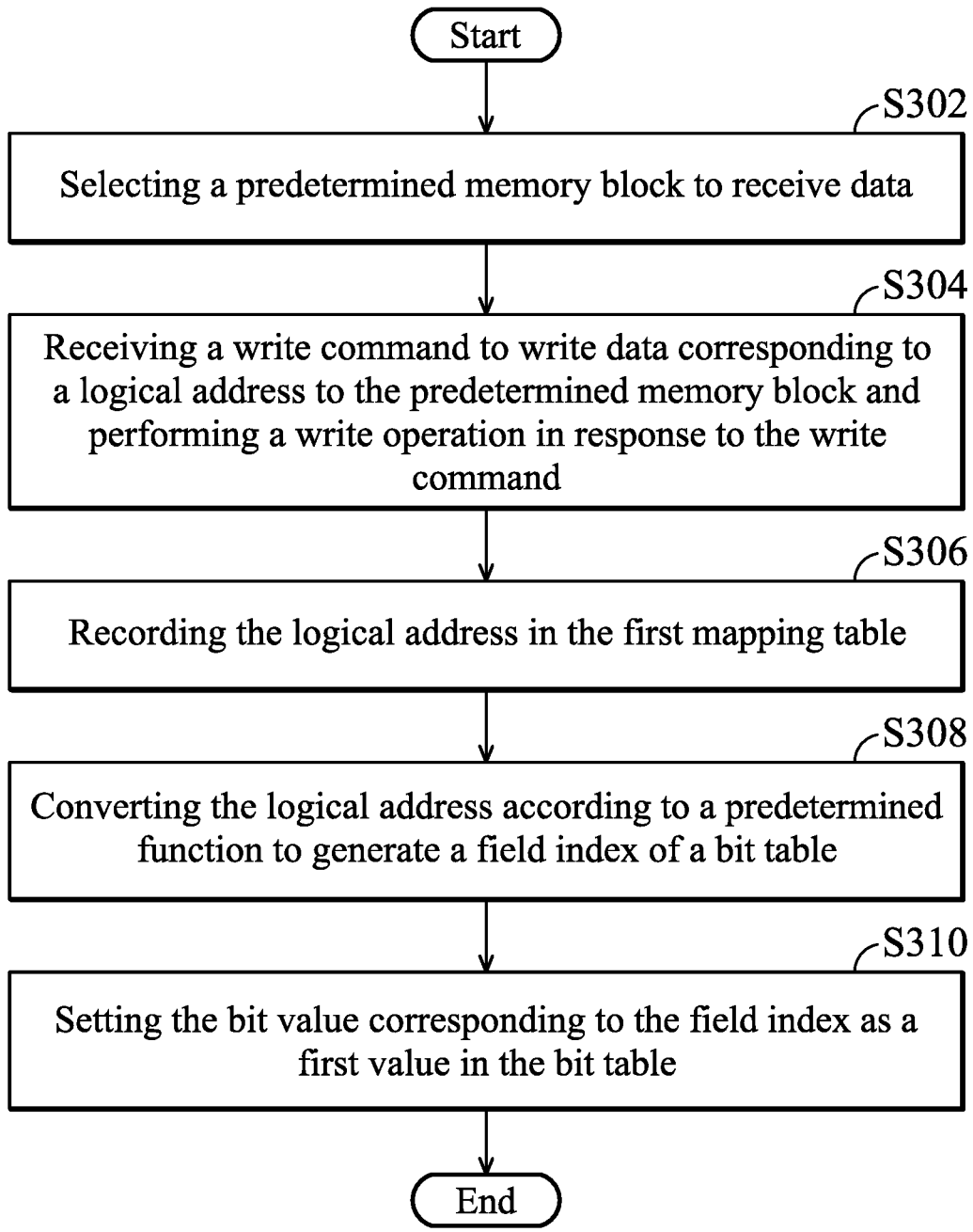
FIG. 3 is an exemplary flow chart of a data processing method according to an embodiment of the invention.

FIG. 3 is an exemplary flow chart of a data processing method according to an embodiment of the invention. FIG. 3 shows the flow of editing the first mapping table and the bit table in a write operation. First of all, the memory controller 110 selects a predetermined memory block to receive data (Step S302). Next, the memory controller 110 receives a write command to write data corresponding to a logical address, and performs a write operation in response to the write command, so as to write the data of a logical page corresponding to this logical address into the memory device 120 (Step S304). Next, the memory controller 110 records this logical address in the first mapping table Table_1 (Step S306). Next, the memory controller 110 converts the logical address according to a predetermined function to generate a field index of the bit table Bit_Table (Step S308). Finally, the memory controller 110 sets the bit value corresponding to the field index as a first value in the bit table Bit_Table (Step S310).

According to an embodiment of the invention, the content recorded in the bit table Bit_Table can facilitate the memory controller 110 to determine whether the possibility of the information that it needs is stored in the first mapping table Table_1 is higher than a predetermined threshold. To be more specific, according to an embodiment of the invention, when the memory controller 110 has to read data corresponding to a second logical address in response to a read command R_CMD, the memory controller may first convert the second logical address to obtain a value as a second field index of the bit table Bit_Table, and determine whether to search the first mapping table Table_1 according to the bit value corresponding to the second field index. In other words, the memory controller 110 may determine whether to search the first mapping table Table_1, or to directly read the second mapping table Table_2 instead of searching the first mapping table Table_1 according to the bit value corresponding to the second field index, so as to find the mapping information of the second logical address (that is, the mapping information of the logical page corresponding to the second logical address).

Figure 4:
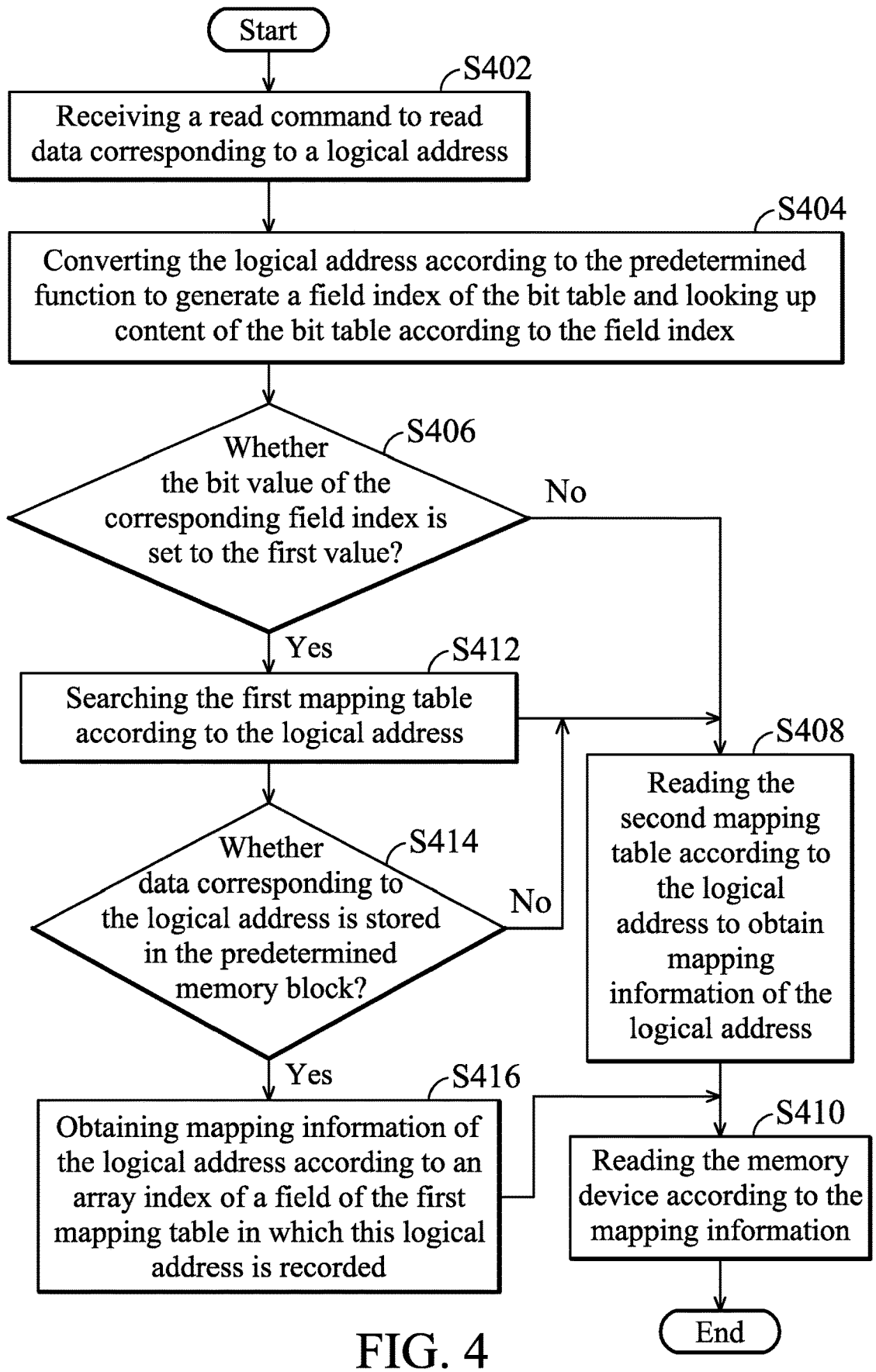
FIG. 4 is another exemplary flow chart of a data processing method according to an embodiment of the invention.

FIG. 4 is another exemplary flow chart of a data processing method according to an embodiment of the invention. FIG. 4 shows the flow of obtaining the mapping information of a specific logical address by searching the mapping table in a read operation. First of all, the memory controller 110 receives a read command to read data corresponding to a logical address (Step S402). Next, the memory controller 110 converts this logical address according to the predetermined function to generate a field index of the bit table Bit_Table, and looks up content of the bit table Bit_Table according to the field index (Step S404). Next, the memory controller 110 determines whether the bit value corresponding to the field index in the bit table Bit_Table is set to the first value (Step S406), so as to determine whether to search the first mapping table Table_1.

According to an embodiment of the invention, when the bit value corresponding to the field index is set to the second value that is different from the first value, the memory controller 110 may directly determine that the mapping information of this logical address is not stored in the first mapping table Table_1. Therefore, the memory controller 110 may directly determine not to search the first mapping table Table_1. According to an embodiment of the invention, the memory controller skips the search of the first mapping table Table_1 and directly read the second mapping table Table_2 according to this logical address instead, so as to obtain the mapping information of this logical address (Step S408).

Since the second mapping table Table_2 has to store the mapping information of a great number of logical addresses, the second mapping table Table_2 is actually a very big table and is stored in a plurality of physical pages in the memory device. The memory controller 110 may select a portion of the second mapping table Table_2 according to this logical address, for example, selecting a physical page storing the mapping including the mapping information of this logical address, load the portion of the second mapping table Table_2 to the buffer memory 116, and then read the portion of the second mapping table Table_2 according to this logical address to obtain the mapping information corresponding to this logical address, that is, information regarding which memory block and which physical page is the data of a logical page corresponding to this logical address stored in.

After obtaining the mapping information of this logical address, the memory controller 110 may read the memory device 120 according to the mapping information, so as to obtain the content of the data corresponding to this logical address (Step S410).

On the other hand, when the corresponding bit value of the field index is set to the first value, the memory controller 120 may determine that the possibility the information that it needs is stored in the first mapping table Table_1 is higher than a predetermined threshold. Therefore, the memory controller 110 may determine to search the first mapping table Table_1 according to this logical address (Step S412), so as to check whether this logical address is stored in the first mapping table Table_1 and determine whether data corresponding to this logical address is stored in the predetermined memory block based on whether the this logical address is recorded in the first mapping table Table_1 (Step S414).

When the data corresponding to this logical address is stored in the predetermined memory block, the memory controller 110 may obtaining mapping information of this logical address according to an array index of a field of the first mapping table in which this logical address is recorded (Step S416). That is, the information regarding which physical page of the predetermined memory block the data corresponding to this logical address is stored in.

After obtaining the mapping information of this logical address, the memory controller 110 may read the memory device 120 according to the mapping information, so as to obtain the content of the data corresponding to this logical address (Step S410).

When the memory controller 110 determines that data corresponding to this logical address is not stored in the predetermined memory block after searching the first mapping table Table_1, the memory controller 110 may further read the second mapping table Table_2 according to this logical address instead, so as to obtain the mapping information of this logical address (Step S408).

As discussed above, in the embodiment of the invention, the predetermined function may be a random function or a hash function, which is characterized in that after the input data n is calculated based on the predetermined function, the value of the corresponding output data m can be uniformly distributed. Therefore, in the application of the invention, after the logical addresses are input and calculated based on the predetermined function, the distribution of the values of the output field indices approaches uniform distribution, and it is the result of scattering or disturbing the logical addresses. Here, the term 'scattering' or 'disturbing' means that, as an example, for contiguous logical addresses, the values of their corresponding field indices may be discontiguous.

According to an embodiment of the invention, the predetermined function may comprise two values, for example, a first value and a second value. The first value of the predetermined function may be selected as a power of 2, and the second value of the predetermined function may be selected as a prime number that is far away from any adjacent number that is a power of 2. For example, in an embodiment of the invention, the first value of the predetermined function may be 32 and the second value of the predetermined function may be 23. Since the previous power of 2 of the value 32 is the value 16, and the prime values between 16 and 32 are 17, 19, 23, 29 and 31. For achieving better normal distribution result in the values of the output data, it is preferably to select the value 23, which is far away from both the value 16 and the value 32, among the aforementioned five prime values. Or, is preferably to select the value which is the median or a value closest to the median of the aforementioned five prime values.

In the following paragraphs, these two values will be utilized as an example to illustrate the conversion of the logical address to the field index according to an embodiment of the invention.

Assuming that the size of the bit table Bit_Table is 16K byte, and each field records 1 bit. The total number of fields in the bit table Bit_Table (that is, the size of the bit table Bit_Table) is 16384*8=131072. Suppose that the starting field index of the bit table Bit_Table is 0, the maximum field index of the bit table Bit_Table is 131071.

In this embodiment, the calculation of the predetermined function comprises two stages of calculation. In the first stage, the logical address is multiplied by the second value to obtain a first calculation result. Then, the first calculation result modulo the first value (e.g., (the first calculation result mod the first value) is performed to obtain a second calculation result. That is, the second calculation result is the remainder obtained when the first calculation result is divided by the first value. Next, in the second stage, the total number of fields in the bit table Bit_Table is multiplied by a ratio of the second calculation result to the first value to obtain a third calculation result as the corresponding field index of the logical address.

For example, when the memory controller 110 has to record the information of the logical address 1001 in the first mapping table Table_1, the field index corresponding to this logical address 1001 may be calculated based on equations (1) and (2) as below:

$$1001*23 \bmod 32=15 \quad \text{Equation (1)}$$

$$131072*15/32=61440 \quad \text{Equation (2)}$$

The obtained value 61440 is the field index corresponding to this logical address 1001.

For another example, the field index corresponding to the logical address 1002 may be calculated based on equations (3) and (4) as below:

$$1002*23 \bmod 32=6 \quad \text{Equation (3)}$$

$$131072*6/32=24576 \quad \text{Equation (4)}$$

The obtained value 24576 is the field index corresponding to the logical address 1002.

For yet another example, the field index corresponding to the logical address 1003 may be calculated based on equations (5) and (6) as below:

$$1003*23 \bmod 32=29 \quad \text{Equation (5)}$$

$$131072*29/32=118784 \quad \text{Equation (6)}$$

The obtained value 118784 is the field index corresponding to the logical address 1003.

It can be known from the above examples that, via the calculation based on the predetermined function, the numerical distribution of the field index obtained from the consecutive logical addresses input to the predetermined function will be broken up. In this manner, the values of the output data (that is, the values of the field indices) can be uniformly distributed.

As discussed above, based on the proposed data processing method, the memory controller 110 can easily determine whether the information that it needs is stored in the first mapping table Table_1 according to the content of the bit table Bit_Table. The bit table Bit_Table can clearly indicate whether the information that it needs may have a high possibility to be stored in the first mapping table Table_1, or clearly indicate that the information that it needs is not stored in the first mapping table Table_1.

When the memory controller 110 can rapidly know that the information that it needs is not stored in the first mapping table Table_1 by just consulting the content of the bit table Bit_Table, the memory controller 110 can directly skip the search of the first mapping table Table_1. In this manner, the above-mention time consuming problem of useless search of the first mapping table Table_1 can be solved and the read operation of the memory device can be effectively sped up.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. A data storage device, comprising:
a memory device, comprising a plurality of memory blocks, each memory block comprising a plurality of physical pages; and
a memory controller, coupled to the memory device and configured to access the memory device,
wherein the memory controller is configured to select a predetermined memory block to receive data and accordingly record a plurality of logical addresses in a first mapping table,
wherein the memory controller comprises a buffer memory, the first mapping table is stored in the buffer memory and records which logical page the data stored in each physical page of the predetermined memory block is directed to,
wherein the buffer memory further stores a bit table, the bit table comprises a plurality of fields and each field records a bit value,
wherein when the memory controller writes data of a logical page that corresponds to a first logical address into the predetermined memory block in response to a write command, the memory controller records the first logical address in the first mapping table, converts the first logical address according to a predetermined function to generate a first field index of the bit table and sets the bit value corresponding to the first field index as a first value in the bit table.

2. The data storage device as claimed in claim 1, wherein when the memory controller has to read data corresponding to a second logical address in response to a read command, the memory controller is configured to convert the second logical address according to the predetermined function to generate a second field index of the bit table, and determine whether to search the first mapping table or not according to the bit value corresponding to the second field index recorded in the bit table.

3. The data storage device as claimed in claim 2, wherein when the bit value corresponding to the second field index is set to a second value that is different from the first value, the memory controller determines not to search the first mapping table.

4. The data storage device as claimed in claim 2, wherein the memory device further stores a second mapping table, the second mapping table corresponds to a plurality of logical pages and is configured to record mapping information of the logical pages, when the bit value corresponding to the second field index is set to a second value that is different from the first value, the memory controller determines to directly read the second mapping table instead of searching the first mapping table.

5. The data storage device as claimed in claim 4, wherein the memory controller is further configured to select a portion of the second mapping table according to the second logical address and load the portion of the second mapping table to the buffer memory, and read the portion of the second mapping table according to the second logical address to obtain the mapping information of a logical page corresponding to the second logical address.

6. The data storage device as claimed in claim 2, wherein when the bit value corresponding to the second field index is set to the first value, the memory controller determines to search the first mapping table according to the second logical address and determine whether data corresponding to the second logical address is stored in the predetermined memory block based on whether the second logical address is recorded in the first mapping table.

7. The data storage device as claimed in claim 6, wherein when the memory controller determines that the data corresponding to the second logical address is stored in the predetermined memory block, the memory controller is configured to obtain mapping information of a logical page corresponding to the second logical address according to an array index of the first mapping table in which the second logical address is recorded.

8. The data processing method as claimed in claim 6, wherein the memory device further stores a second mapping table, the second mapping table corresponds to a plurality of logical pages and is configured to record mapping information of the logical pages, when the memory controller determines that the data corresponding to the second logical address is not stored in the predetermined memory block, the memory controller is further configured to select a portion of the second mapping table according to the second logical address and load the portion of the second mapping table to the buffer memory, and read the portion of the second mapping table according to the second logical address to obtain the mapping information of a logical page corresponding to the second logical address.

9. A data processing method for a data storage device comprising a memory device and a memory controller, wherein the memory device comprises a plurality of memory blocks, each memory block comprises a plurality of physical pages, the memory controller is coupled to the memory device and configured to access the memory device, the method is performed by the memory controller and comprises:
selecting a predetermined memory block to receive data;
receiving a write command to write data of a logical page corresponding to a first logical address to the predetermined memory block;
recording the first logical address in a first mapping table, wherein the first mapping table is stored in a buffer memory of the memory controller and records which logical page the data stored in each physical page of the predetermined memory block is directed to;
converting the first logical address according to a predetermined function to generate a first field index of a bit table, wherein the bit table is stored in the buffer memory and comprises a plurality of fields, and each field records a bit value; and
setting the bit value corresponding to the first field index as a first value in the bit table.

10. The data processing method as claimed in claim 9, further comprising:
receiving a read command to read data corresponding to a second logical address;
converting the second logical address according to the predetermined function to generate a second field index of the bit table; and
determining whether to search the first mapping table or not according to the bit value corresponding to the second field index recorded in the bit table.

11. The data processing method as claimed in claim 10, wherein the step of determining whether to search the first mapping table or not according to the bit value corresponding to the second field index recorded in the bit table further comprises:
determining not to search the first mapping table when the bit value corresponding to the second field index is set to a second value which is different from the first value.

12. The data processing method as claimed in claim 10, wherein the step of determining whether to search the first mapping table or not according to the bit value corresponding to the second field index recorded in the bit table further comprises:
determining to directly read a second mapping table instead of searching the first mapping table when the bit value corresponding to the second field index is set to a second value which is different from the first value, wherein the second mapping table is stored in the memory device, the second mapping table corresponds to a plurality of logical pages and is configured to record mapping information of the logical pages.

13. The data processing method as claimed in claim 12, further comprising:
selecting a portion of the second mapping table according to the second logical address;
loading the portion of the second mapping table to the buffer memory; and
reading the portion of the second mapping table according to the second logical address to obtain the mapping information of a logical page corresponding to the second logical address.

14. The data processing method as claimed in claim 10, wherein the step of determining whether to search the first mapping table or not according to the bit value corresponding to the second field index recorded in the bit table further comprises:

determining to search the first mapping table according to the second logical address when the bit value corresponding to the second field index is set to the first value; and determining whether data corresponding to the second logical address is stored in the predetermined memory block based on whether the second logical address is recorded in the first mapping table.

15. The data processing method as claimed in claim 14, further comprising:

obtaining mapping information of a logical page corresponding to the second logical address according to an array index of the first mapping table in which the second logical address is recorded when the memory controller determines that the data corresponding to the second logical address is stored in the predetermined memory block.

16. The data processing method as claimed in claim 14, further comprising:

when determining that the data corresponding to the second logical address is not stored in the predetermined memory block, determining to read a second mapping table, wherein the second mapping table is stored in the memory device and corresponds to a plurality of logical pages to record mapping information of the logical pages;

selecting a portion of the second mapping table according to the second logical address;

loading the portion of the second mapping table to the buffer memory; and reading the portion of the second mapping table from the buffer memory according to the second logical address to obtain the mapping information of a logical page corresponding to the second logical address.

* * * * *